Oct. 15, 1946.　　　　W. H. SILVER　　　　2,409,228
POWER LIFT
Filed April 8, 1944　　　3 Sheets-Sheet 1

WITNESS
E. B. BJURSTROM

INVENTOR.
WALTER H. SILVER
ATTORNEYS

Oct. 15, 1946.　　　　W. H. SILVER　　　　2,409,228
POWER LIFT
Filed April 8, 1944　　　　3 Sheets-Sheet 2

WITNESS
E. B. BJURSTROM

INVENTOR.
WALTER H. SILVER

ATTORNEYS

Patented Oct. 15, 1946

2,409,228

UNITED STATES PATENT OFFICE 2,409,228

POWER LIFT

Walter H. Silver, Moline, Ill., assignor to Deere & Company, Moline, Ill., a corporation of Illinois Application April 8, 1944, Serial No. 530,213

16 Claims. (Cl. 97—50)

This application is a continuation-in-part of my co-pending application, Serial No. 556,850, filed October 2, 1944, as a continuation of my prior application, Serial No. 443,993, filed May 21, 1942, for Power lift.

The present invention relates generally to agricultural implements and more particularly to implements having both front and rear operating units and power mechanisms for controlling them.

The object and general nature of the present invention is the provision of new and improved tool controlling means which is so arranged that either of two front units may be raised first, with mechanism cooperating therewith to leave the rear unit in operating position until the other front unit is raised. This is a particular feature of the present invention and is especially advantageous in a cultivator in which, due to terraces, drainage ditches, and the like, there may be a considerable number of point rows, and in order to cultivate both sides of every row, it is not desirable to raise the rear unit until the last front unit is raised.

Further, it is a feature of this invention to provide a power-operated lifting unit connected with two tool units through differential means, in connection with optionally controlled locks or latches, one for each tool unit, whereby when one tool unit is held against movement the power of the lifting unit is diverted to the other unit. In this way, either or both of the tool units may be raised as desired, or they may be raised one at a time in any sequence. More specifically, a feature of this invention is the provision of a pair of implement shifting parts connected by differential means with a single power operated unit of a tractor, together with suitably controlled brakes or locks associated, respectively, with the implement shifting parts.

It is an additional feature of this invention to provide a tractor mounted cultivator outfit in which the right hand front and rear rigs are raised and lowered together and the left hand front and rear rigs are raised and lowered, with an operative connection with the center rear rig which is so constructed and arranged that the rear center rig is left in full operating position when the tools at one side are raised but is raised completely with the raising of the tools at the other side, irrespective of whether the tools at one side or the other side are raised first.

These and other objects and advantages of the present invention will be apparent to those skilled in the art after a consideration of the following detailed description, taken in conjunction with the accompanying drawings, in which Figure 1 is a plan view of a two-row tractor mounted cultivator in which the principles of the present invention have been incorporated;

Figure 1:
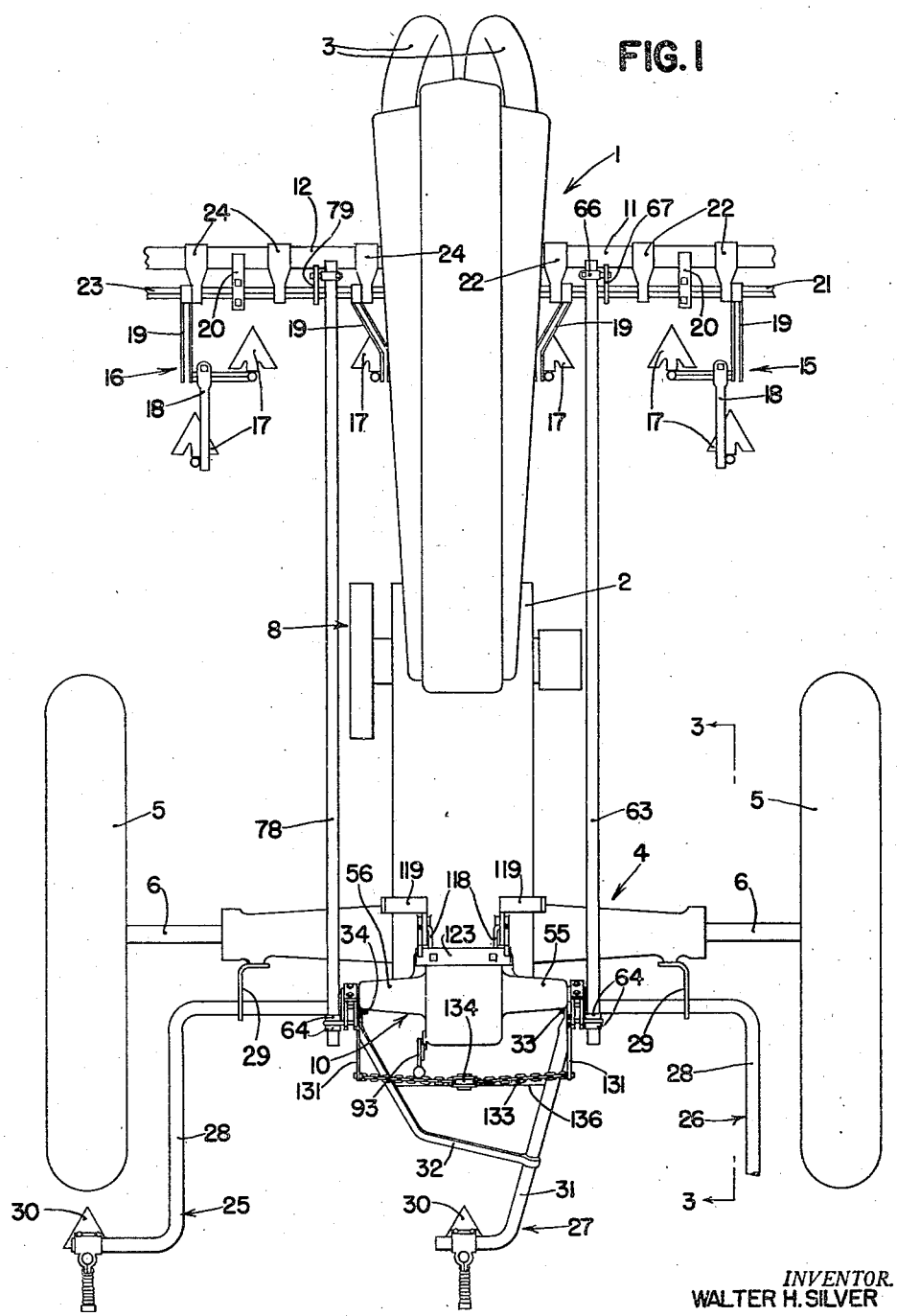

Referring now to the drawings, the present invention is shown as embodied in a tractor-mounted cultivator in which the tractor is indicated in its entirety by the reference numeral 1 and includes a frame 2, front wheels 3, a rear axle structure 4, and rear wheels 5 connected to axle shafts 6 that are supported in the rear axle structure 4 in the usual manner. The tractor motor is indicated at 8 and is connected not only to propel the tractor but also to actuate a power lift unit that is indicated in its entirety by the reference numeral 10 to which more detailed reference will be made below.

The tractor 1 adjacent its forward end carries two laterally outwardly extending draft bars 11 and 12. Preferably, each is in the form of a pipe member secured, as by welding, to the inner end of an attaching plate by which each of the draft bars 11 and 12 is mounted on the frame of the tractor. The draft bars 11 and 12 thus provide means by which tools may be connected in draft transmitting relation and in supported relation with respect to the tractor 1. According to the present invention, the tools are separately actuated, and to facilitate disclosure of the invention I have shown the tools as in the form of two separate groups, indicated at 15 and 16, respectively. Each group or set of tools, as illustrated, includes a plurality of cultivator shovels 17 mounted on tool bars 18 that are connected by parallel link means 19 with the associated draft bars 11 and 12. The right hand set of tools 15 is adapted to be raised and lowered by means of a rockshaft 21 supported in brackets 22 on the right hand draft bar 11. An arm 20 on the rockshaft 21 engages the bar 11 to limit the upward movement of the tools 15. Similar means is provided for limiting the upward movement of the tools 16. The left hand set of tools, indicated at 16, is mounted in a similar way, as by means including a rockshaft 23 rockably carried by the draft bar 12 in brackets 24.

The major portion of the cultivating is performed by the right and left hand tool units, just described, but frequently rear tools, such as those indicated at 25, 26 and 27 are provided for cultivating in rear of the front and rear wheels of the tractor. The rear set 25 includes a tool bar 28 pivoted on a bracket 29 that is fixed in any suitable manner to the left hand extension of the rear axle structure 4. The tool bar 28 carries a cultivator shovel 30 that is disposed substantially rearwardly of the left hand rear wheel 5. The right hand tool unit 26 is of similar construction and is pivotally supported in the manner just described. The rear center tool unit 27 includes a tool bar 31 that carries a shovel 30 and is pivotally connected, as at 33, to the laterally inner end of the tool bar 28 of the right hand unit 26. A brace 32 is fixed to the tool bar 31 and is pivotally connected, as at 34, to the laterally inner end of the tool bar 28 of the left hand unit 25, whereby the rear center unit 27 is movable relative to either of the other rear units. The shovel 30 of the rear center unit 27 is disposed substantially in line with the front wheels 3.

More specific reference to the power lift unit 10 and associated parts will be made below, but it will suffice at this point to note that the power lift 10 includes a pair of separate axially aligned right and left hand rockshafts 53 and 54 mounted in coaxial relation in extensions 55 and 56 which form a part of the power lift housing 37. The right hand power lift shaft 56 is squared, as at 58, and receives an arm 61 extending generally upwardly and at its upper end is apertured to receive a swivel eye 62 in which the rear end of a lifting pipe 63 is disposed. A set screw collar 64 is adjustably fixed to the rear end of the lift pipe 63 on each side of the swivel eye 62. The forward end of the lift pipe 63 carries a trunnion member 66 which is pivotally connected with the upper end of an arm 67 that is fixed to the inner end of the rockshaft 21. A second arm 71 is fixed to the outer end of the rockshaft 53 and is connected by a chain 72 to an arm 73 that is fixed to the tool bar 28 of the right hand unit 26. The chain 72 is arranged and connected so that whenever the power lift rockshaft 53 is actuated to shift the lifting pipe 63 forwardly and raise the front tools 15, the rear tool unit 26 is also raised.

The lifting connections for the front and rear tools at the left side of the tractor are substantially the same as just described. Briefly, an arm 75 is fixed to the outer end of the left power lift rockshaft 54 and is connected by a swivel eye 76 and a collar 77 with the left hand cultivator lift pipe 78. The forward end of the latter is connected to an arm 79 fixed to the left forward lifting rockshaft 23. Another arm 81 is connected to the outer end of the rockshaft 54 and is connected by a chain 82 to an arm 83 fixed to the tool bar 28 of the left hand rear unit 25. Thus, when one rockshaft is actuated both the front and rear tools at one side of the tractor are raised and when the other power lift rockshaft at the other side of the tractor is actuated the front and rear tools at that side of the tractor are raised. When both rockshafts 53 and 54 are actuated both the front tools and the rear tools, at both sides of the tractor, are raised and lowered together.

According to the principles of the present invention, the tools at only one side of the tractor may be raised while the others may be held in lowered or operating position, and likewise, either set of tools may be lowered into operating position while holding the tools at the other side in raised position. The mechanism by which the tools may be thus operated and controlled will now be described.

Figure 3:
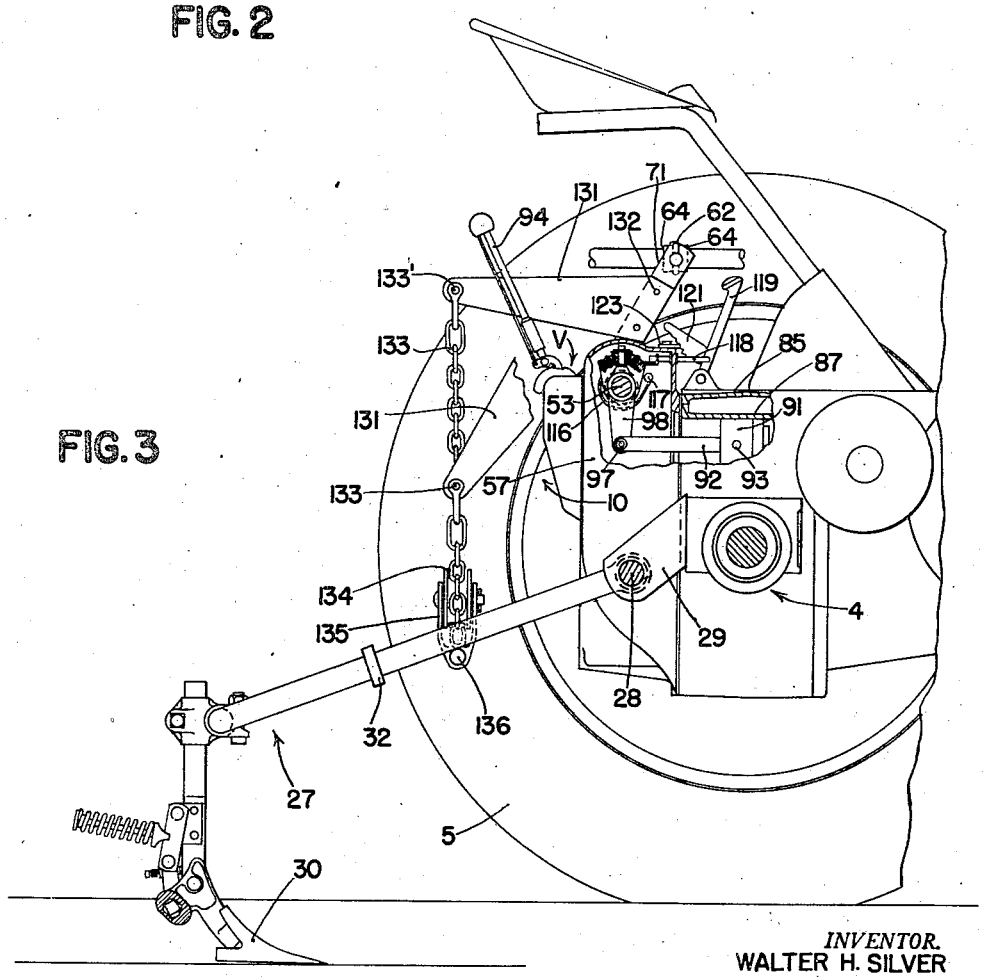
Figure 3 is an enlarged fragmentary rear view, taken generally along the line 3—3 of Figure 1.
Figure 4:
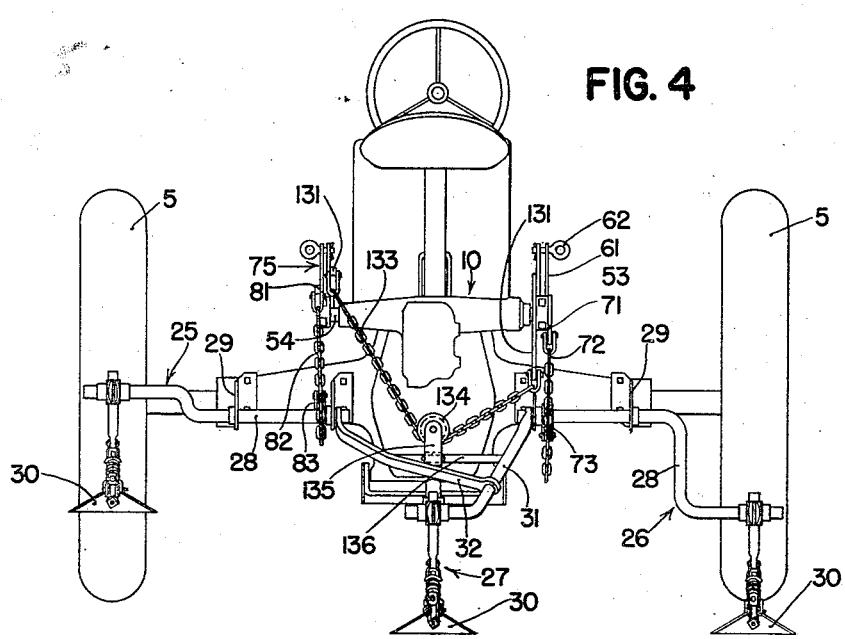
Figure 4 is a rear view showing the position of the center rear rig when the tools at one side only are raised.
Figure 5:
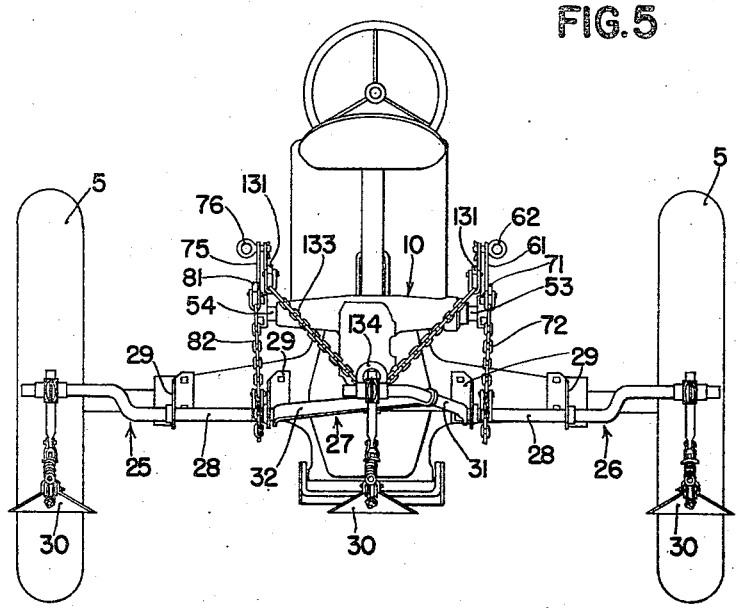
Figure 5 shows the raised position of the center rear rig.

Referring more particularly to Figures 3 and 4, the tractor 1 includes a rear axle housing 85 to the rear of which the power lift housing 57, mentioned above, is secured. The power lift housing 57 includes a hydraulic cylinder 87 that extends into the interior of the rear axle housing 85. This construction is similar to that shown in U. S. Patent No. 2,107,760, issued February 8, 1938, to Elmer McCormick et al., to which reference may be made if necessary. Movably disposed within the cylinder 87 is a piston 91 to which the front end of a connecting rod 92 is pivoted, as at 93. Fluid under pressure is directed into the front end of the cylinder 87, forward of the piston 91, and is under the control of power lift control mechanism which is similar to that shown in the co-pending application, Serial No. 434,256, filed March 11, 1942, by Frank T. Court, to which reference may be made if necessary. Briefly, such a power lift control mechanism includes hydraulic power actuated means for directing fluid under pressure into the cylinder 87 to act against the piston 91 therein, the flow of fluid to and from the cylinder 87 being under the control of valve mechanism V which includes a control hand lever 94. As more clearly disclosed in the aforesaid Court application, the parts are so arranged and constructed that when the pressure in the system increases to an abnormal amount, the hand lever 94 is automatically returned to a neutral position in which the pressure in the system is relieved but the piston 91 remains hydraulically locked in the cylinder 87, thus holding all parts connected with the piston hydraulically locked in a raised or partially raised position.

The rear end of the connecting rod 92 is connected by a pin 97 with an arm 98. The arm 98 is provided with a pair of trunnions 99 which are seated, respectively, in sockets 100 formed in the inner ends of sleeves 101 that are fixed, respectively, to the squared ends 102 of the pair of right and left hand rockshafts 53 and 54. Thus, the arm 98 is mounted for swinging movement in between the inner ends of the rockshafts 53 and 54 and is movable with respect thereto. At its upper end the arm 98 is formed with or carries a spindle 108 on which a pinion 109 is mounted for rotation. The spindle 108 meshes with a pair of sectors 111 which are formed on or carried by the inner ends of the sleeves 101. A cotter 113 holds the pinion 109 in place on the spindle 108.

Figure 2:
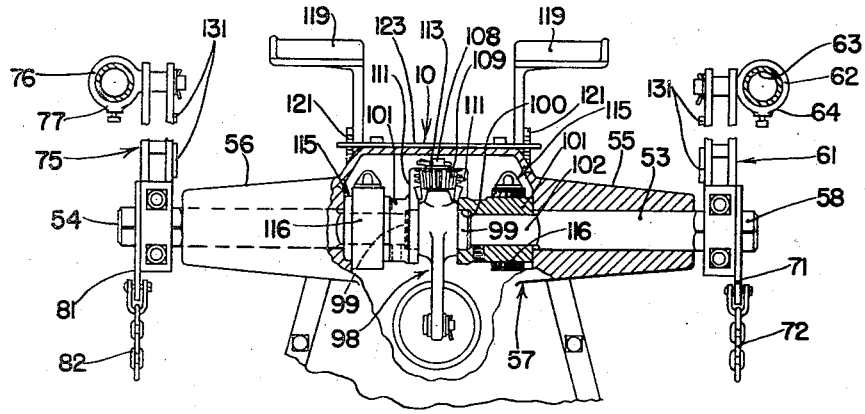
Figure 2 is a rear view, with certain parts broken away to show the certain details of the preferred structure wherein a pair of separate rockshafts are provided with a differential connection to a power unit, and enclosed locks for controlling the movement of each rockshaft independently of the other.

A locking device 115 is provided for each of the rockshafts 53 and 54 and is disposed, as best shown in Figure 2, within the housing 57. Each locking device 115 comprises a brake band 116 anchored, as at 117 (Figure 3), to a stationary part of the housing and connected at its other end with a rod 118 that extends out of the housing forwardly and is connected to a brake pedal 119. Each locking device 115 is formed as just described, hence the description of one will suffice. Each brake pedal 119 has a latching plate 121 pivoted thereto and provided with teeth which cooperate with a locking plate 123 secured to the upper portion of the housing. The latch plates 121, or either of them, may be turned into the dotted line position (Figure 3) in which it is inoperative, but when the plate is disposed in its full line position the teeth thereof are adapted to engage the stationary plate 123 so as to hold the brake band 116 in locking position. Each brake band 116 carries the usual lining and is disposed about the associated sleeve 101 on the inner squared end 102 of the associated rockshaft.

The center rear tool 27 is controlled by connections associated with the lifting means for the right and left hand rear tools and so arranged that the center tool is raised when both of the other tools are raised, but if one of the rear tools remains in or is held in a lowered position while the other raised, the center tool also remains in its lowered position until the last of the rear tools to be raised is actually lifted into its raised position.

Referring now to Figure 4, an elongated arm 131 is fixed, as at 132, to each of the lift arms 71 and 81. A chain 133 is connected at its ends, as at 133', to the arms 131 and is trained over a pulley 134 connected with the center tool unit 27 through a sheave yoke 135 and a cross bar 136 welded to the rig beam 31 and its brace section 32. The chain 133 is arranged with sufficient slackness that, as best shown in Figure 4, when only one of the rear tools is raised, the rear tool 27 is not raised; instead, however, practically all slack is taken out of the chain 133. Therefore, when the other tool is raised, the rear tool 27 is also raised therewith; the lengths of the arms and cooperating parts being arranged so that the movement of one of the arms, 71 or 81, is sufficient to perform the entire raising operation so far as the center rear tool unit is concerned. Also, when both of the right and left hand rear tools are raised at the same time, the center rear tool is also raised, specifically, by the latter half, approximately, of the movement of each of the right and left hand rear tools.

The operation of the invention as so far described is substantially as follows.

Figure 1 shows the cultivator in a raised or inoperative position, both the right and left hand tools, both front and rear, being held in raised position by the power lift unit 10. The control lever 93 of the latter may be turned at any time desired into a lowering position in which either or both sets of right and left hand tools will be lowered. Assuming that the operator is cultivating point rows and that at the beginning of the rows to be cultivated he desires to lower the right hand tools before the left hand tools, the operator will first step on the left hand pedal section 119, thus holding the left hand rockshaft 54 and the left hand lift pipe 78 against movement. He will then move the power lift control lever 94 into a lowering position, which will permit the right hand tools to lower, the lift pipe 63 moving rearwardly and causing the piston 91 to be forced forwardly in the cylinder 87 approximately half way. After the outfit has traveled the desired distance with the right hand tools only in operating position, the left hand tools may be lowered into operating position merely by the operator releasing the left foot pedal 119. The left hand tools then move by gravity into an operating position, the lift pipe 78 moving rearwardly and moving the piston 91 forwardly the rest of the way in the cylinder 87.

Substantially the reverse action takes place at the end of the point rows where it may be desired to raise the right hand tools while permitting the left hand tools to remain in operating position for an additional distance along the rows. In that event, the operator again steps on the left hand pedal 119, clamping or locking the left hand rockshaft 54 and the left hand lift pipe 78 against movement. Then the operator will actuate the power lift lever 94, causing all of the power of the power lift unit 10 to be diverted to the right hand power lift rockshaft 53, thus shifting the right hand lifting pipe 63 forwardly and raising both the front and rear right hand tools. When the left hand tools are locked in their lowered position and the power lift unit energized, the power lift mechanism remains in operation until the right hand tools reach their raised position, at which time no further movement is possible. This momentarily causes an overload in the hydraulic system of the power lift unit but the mechanism of the control means therefor is arranged so that this momentary abnormal increase in pressure acts to automatically return the control lever 94 of the power lift unit to a neutral position, thus relieving the high pressure and at the same time hydraulically locking the raised tools in their raised position. After the outfit has traversed the desired distance, the operator releases the left pedal 119 and then again actuates the power lift unit 10, causing it to raise the left hand tools to their fully raised position, determined by the stop arm 20, after which the hydraulic power lift unit again automatically returns the control valve to neutral position. It will be observed that when the tools at one side of the tractor are held in raised position while the tools at the other side are lowered, the rear center tool lowers with the tools first to be lowered. By this means full cultivation at both sides of the row is started immediately. It will also be noted that for operation with this type of control, the power lift means should be so constructed that it can be operated in two stages or ranges, and so constructed that it may be locked in an intermediate position in order to hold one set of tools in raised position while accommodating the disposition of the other tools in their lowered position. Preferably, also, the power lift unit 10 is so constructed that when the lift pipe clamping means are both released, the power lift unit 10 may be operated to raise or lower the tools by different amounts in their operating positions so as to provide for depth adjustments. If desired, any other suitable means may be provided for adjusting the operating positions of the tools, such as, for example, the adjustable hand lever controlled stop means shown in U. S. Patent No. 1,958,625, issued May 15, 1934, to Theodore W. Johnson.

It is not essential to the present invention to employ power lift mechanism having the feature of the valve automatically returning to neutral upon the occurrence of an overload. For example, hydraulic lift mechanism may be employed in which there is simply a relief valve, such as is shown in the McCormick et al. patent, identified above. When employing hydraulic lift mechanism in which an overload relief valve is provided, when the operator desires to raise only one of the cultivator units, he actuates the brake or clamping device associated with the other unit in order to hold the latter in lowered position, and then he actuates the power lift mechanism. When the first mentioned cultivator unit reaches its raised position and can move no higher, the relief valve opens and remains open for the length of time that it is desired to hold the other cultivator unit in lowered position. As soon as that distance has been traversed, the operator merely releases the brake or clamping device, and without further attention to the power lift, the other cultivator unit will then be moved into its raised position. An arrangement of this kind has one advantage over previously described arrangements in that it is not necessary to actuate the power lift the second time when raising the last cultivator unit.

It is not essential, moreover, to the present invention that the power lift valve and associated mechanisms be such that the valve is automatically returned to a neutral position upon an abnormal increase in pressure or that a relief valve be provided, so far as the present invention is concerned, since, if desired, the operator may manually stop the raising of the power lift unit by operating the lever 94 at the desired point when one cultivator unit is moved into its raised position while he is holding the other unit down in its operating position.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim and desire to secure by Letters Patent is:

1. A cultivator comprising supporting means, separately movable right and left hand cultivator rigs carried by said supporting means, a center cultivator rig movably connected with the rear portion of said supporting means, a pair of separately movable parts carried by said supporting means and connected, respectively, with said right and left hand cultivator rigs, lifting mechanism connected with said parts for actuating the latter to raise said right and left hand cultivator rigs optionally simultaneously or separately, and mechanism connecting both of said parts with said rear cultivator rig whereby the latter is raised only when both of said right and left hand cultivator rigs are raised.

2. A cultivator comprising supporting means, right and left hand cultivator rigs, means movably connecting said rigs with said supporting means for either separate or simultaneous movement relative thereto, a pair of separately movable parts carried by said supporting means and connected with said right and left hand rigs for controlling the lowering movement thereof, mechanism connected with said parts for raising said right and left hand rigs, means for optionally locking either of said parts against movement so as to hold the associated cultivator rig in a raised position, and means connecting said rear cultivator rig with both of said parts whereby said rear cultivator rig is raised into inoperative position by the movement of said parts when raising both of said right and left hand rigs, said connecting means being arranged so that said rear cultivator rig is lowered into operating position when either of said right and left hand rigs is lowered into operating position.

3. In a cultivator, supporting means, a cultivator rig movably connected with said supporting means for movement into and out of a raised position, a pair of separately operable members movably mounted on said supporting means, and means connecting said cultivator rig with both of said members whereby said rig is raised only when both of said members are moved into a raised position.

4. In a cultivator, supporting means, a cultivator rig movably connected with said supporting means for movement into and out of a raised position, a pair of separately operable members movably mounted on said supporting means, a locking means associated with each of said members, each locking means being adapted to hold the associated member in one position, and means connecting said cultivator rig with both of said members whereby said rig may be lowered into operating position by releasing either of said locking means.

5. The invention set forth in claim 4, further characterized by raising means connected with both of said members and acting through the latter for raising said cultivator rig.

6. An agricultural implement comprising supporting means, a ground working tool movably connected with said supporting means and shiftable between a ground working position and a raised inoperative position, a pair of separately movable members mounted on said supporting means, mechanism for moving said members either separately or simultaneously, a connecting part having a flexible intermediate section and pivotally connected at its ends with said members, and means on said ground working tool loosely and movably receiving the flexible section of said connecting part, whereby either of said members may be moved through a given extent without moving said tool but movement of both of said members acts through said connecting part for shifting said tool into a raised position.

7. The invention set forth in claim 6, further characterized by additional tools connected, respectively, with said supporting means and with said members whereby movement of either member controls the associated one of said additional tools.

8. A cultivator adapted to be mounted on a tractor having a power lift, comprising a right hand set of front tools, a left hand set of front tools, a rear tool, means for raising each set of tools, means for differentially connecting both of said raising means with said tractor power lift to be actuated by the latter, optionally operable means for holding either of said raising means against movement, whereby operation of said power lift acts to operate the other raising means, and means connecting the rear tool with both of said raising means whereby said rear tool is not raised until both of said right- and left-hand sets of tools are raised.

9. A cultivator adapted to be mounted on a tractor having a power lift, comprising a right hand set of front tools, a left hand set of front tools, a rear tool, mechanism for lowering said sets of tools optionally into lowered position, either simultaneously or separately, and including a part for each set movable concomitantly therewith, means for connecting both of said parts with said rear tool, whereby the latter is lowered into operating position whenever either of said right and left hand sets of tools is lowered, and means connecting said power lift with said tools for raising all of them into inoperative position.

10. The invention set forth in claim 9, further characterized by said connecting means including a pulley on said rear tool, a chain trained over said pulley, and means connecting the ends of said chain with said parts.

11. An agricultural implement comprising supporting means, a pair of separately operable parts mounted thereon, an agricultural tool movably connected with said supporting means, a chain connected at its ends with said parts, respectively, and means connecting the intermediate portion of said chain with said tool, the length of said chain being such, when both separately operable parts and the tool are in their lowered positions, that a limited amount of movement of either of said parts in the raising direction is accommodated without moving said tool.

12. An agricultural implement comprising a pair of separately movable front tool means, a pair of separately rockable members connected, respectively, with said front tool means, a toothed sector on each member, a shiftable part carrying a pinion meshing with both of said sectors, operating means connected with said shiftable part and acting through said pinion and sectors for shifting either or both of said rockable members, optionally, means associated with said rockable members, respectively, for optionally restraining either against movement, a rear tool, means loosely connecting said rear tool with both of said rockable members, said connecting means having sufficient looseness to accommodate movement of either of said rockable members relative to the other without moving said rear tool but movement of both of said rockable members acts to raise said rear tool.

13. An agricultural implement comprising supporting means, a pair of spaced apart front tool means movably connected with said supporting means for movement between raised and lowered positions, a pair of separately rockable members connected, respectively, with said tool means and each movable through a given extent of movement for moving the associated tool means from lowered to raised position, a toothed sector on each member, a shiftable part carrying a pinion meshing with both of said sectors, operating means connected with said shiftable part and acting through said pinion and sectors for shifting either or both of said rockable members through said given extent of movement, means associated with said rockable members for optionally restraining either against movement, whereby movement of said operating means acts through said pinion and sectors for moving the other rockable member through its extent of movement, a rear tool pivotally connected with said supporting means, and means loosely connected between said rear tool and both of said rockable members, the looseness of said connecting means being sufficient to accommodate movement of either of said rockable members through its extent of movement without raising said rear tool and said connecting means being connected with said tool at a distance sufficiently close to the pivot axis of said rear tool that, after one of said rockable members has been moved in the raising direction through its extent of movement, the corresponding movement of the other rockable member through its extent of movement raises said rear tool into its completely raised position.

14. An agricultural implement comprising a pair of spaced apart separately movable tool means movable generally vertically in substantially parallel planes, a pair of separately rockable members connected, respectively, with said tool means, a toothed sector on each member, a shiftable part carrying a pinion meshing with both of said sectors, operating means connected with said shiftable part and acting through said pinion and sectors for shifting either or both of said rockable members, and means associated with said rockable members for optionally restraining either against movement and moving the other generally vertically in its place of movement.

15. A two-row cultivator comprising laterally spaced tools for cultivating two crop rows, said tools being movable independently of each other and shiftable generally vertically in substantially parallel planes, a support with which said tools are movably connected, separate means connected with each tool for raising the same when the other tool is held against movement, said means including a pair of axially aligned rockshafts carried by said support, a power lift unit on said support, differential means connected between said power lift unit and said rockshafts, and releasable holding means carried by said support and connected for locking either of said rockshafts against movement, whereby the operation of said power lift unit reacts thereagainst for actuating the other rockshaft and raising the tool associated therewith in its generally vertical plane of movement while the other tool is held against movement.

16. A two-row cultivator comprising laterally spaced front tools and laterally spaced rear tools, including a center tool, for cultivating two crop rows, a support with which said tools are movably connected, separate means connected with the front and rear tools, except said center tool, for raising the same, the tools at one side of said support being movable independently of the tools at the other side thereof, separate means connected with the tools at each side of said support for raising them, including a pair of aligned rockshafts, a single power lift unit carried by said support, differential means connected between said power lift unit and the inner ends of said rockshafts, releasable holding means carried by said support and operatively associated with said rockshafts for holding either of them and the associated tools against movement, whereby the operation of said power lift unit reacts thereagainst for raising the tools at the other side of said support, an auxiliary arm carried by each of said rockshafts, and mechanism connected between said auxiliary arms and said center tool for lowering the latter when either of the other set of tools is lowered and for raising the center tool only when the tools at both sides of said support are raised.

WALTER H. SILVER.